United States Patent [19]

Frazier et al.

[11] Patent Number: 5,011,546

[45] Date of Patent: Apr. 30, 1991

[54] WATER SOLUBLE SOLDER FLUX AND PASTE

[75] Inventors: Janice D. Frazier; Robert L. Jackson, both of San Jose, Calif.; Richard A. Reich, Georgetown, Tex.

[73] Assignee: International Business Machines Corporation, Armonk, N.Y.

[21] Appl. No.: 508,740

[22] Filed: Apr. 12, 1990

[51] Int. Cl.$^5$ ............................................. B23K 35/34
[52] U.S. Cl. ...................................... 148/23; 148/24; 148/25
[58] Field of Search ...................................... 148/23–25

[56] References Cited

U.S. PATENT DOCUMENTS

| | | | |
|---|---|---|---|
| 4,428,780 | 1/1984 | Shedroff | 148/23 |
| 4,478,650 | 10/1984 | Zado | 148/23 |
| 4,557,767 | 12/1985 | Hwang | 148/23 |

*Primary Examiner*—Peter D. Rosenberg
*Attorney, Agent, or Firm*—Robert B. Martin

[57] ABSTRACT

Solder flux compositions and pastes made therefrom, consisting essentially of solder metal powder, an amount of non-corrosive water soluble flux, said water soluble flux comprising a mixture of 2 non-corrosive water-soluble components, one of which is a non-halogenated amine, preferably triethanolamine and the other of which is an organic moiety with a polar group, preferably GAFAC RE-610.

17 Claims, No Drawings

WATER SOLUBLE SOLDER FLUX AND PASTE

BACKGROUND OF THE INVENTION AND PRIOR ART

The production of circuit boards for certain types of data processing equipment in the computer industry requires the use of a combination of wave solder and solder paste, known as surface mount technology (SMT), to place components on the circuit boards.

As in any production technique, any cost savings are continuously being sought. To this end, any reduction in the number of chemicals and chemical steps will result in an improvement in manufacturing process and a subsequent savings of cost. One of the major cost elements in the production of certain circuit boards is the surface mount process itself, and a key component to the process is solder paste, which paste plays multiple roles in the process of surface mount technology.

The first step in surface mount technology is registration of the circuit board possessing the appropriate circuitry connection lines and copper pads for the attachment of the electrical components (such as capacitors and resistors, small outline integrated circuits and transistors, flat packs, and plastic leaded chip carriers). Solder paste is screened onto the circuit board using an appropriately patterned stencil, in all of the locations where connection of the components to the copper pads is required. After screening the solder paste onto the circuit board, the board is moved to a pick and place machine that places all the components on the prepared sites. The solder paste must be tacky enough to hold the components in their required location until the board is subject to reflow, at which time the solder paste flows to become the soldered connection for the components. Tack life is the term used for the length of time that a solder paste is sticky enough to hold components when they are placed in the screened sites. For a solvent-based solder paste the tack life can be a critical factor as the solvent begins to evaporate and dry the paste out.

Reflow is the term used to describe heating the solder above its melting temperature to give a soldered joint; for 63/37 tin/lead solder, the usual reflow temperature used is 185°–230° C. The process is repeated for the back side of the board as needed. Using rosin based commercial solder pastes, the board must be cleaned using a chlorofluorocarbon (CFC) solvent since the rosin flux used in commercial pastes is soluble in organic solvents only.

Thereafter, other components that require wave solder mounting are placed on the circuit boards. Wave solder consists of using an adhesive to hold components on the board and cleaning the copper areas on the circuit board with a liquid flux before passage over a "wave" of liquid solder. The final cleanings use water washes with and without added surfactants. Any necessary repairs are performed manually by operators after visual inspection of the completed circuit board, and is termed "rework."

The process of surface mount technology creates stringent material demands on the solder paste, which as noted above serves a variety of functions. Not only will the paste be making the inter-connections, it must be tacky and capable of holding the components in place before the reflow process. The solder paste is a materials system comprised of a suspension of solder powder in a flux. The flux component of the solder paste is the material that controls many of the requirements of the solder paste. The flux first must remove metal oxides from the solder powder to allow reflow of all the solder properly. It must contribute the right rheology for the screening process, and the paste must act as an adhesive to hold the components in place until reflow. Further, any residues left must be easily removed preferably by use of non-toxic materials, such as water, and any minor amount of residues must be non-conducting and non-corrosive.

Current solder pastes in use have a flux system composed of a complex mixture derived from a natural product based pine-tar distillate fraction (called rosin). This flux system leads to irreproducibility in results and is characterized by lot-to-lot and vendor-to-vendor variations. A variety of thickeners, activators and vehicles are added to the rosin to create the correct qualities of reflow and rheology. The rosin-based system contains volatile solvents that lead the solder paste to exhibit a short tack life (a few hours) as well as some screening problems if the material is left on the stencil too long, such as clogging the stencil by drying in the apertures. Additionally, a drying step is required before reflow to remove the solvents; otherwise problems (such as sputtering) during the reflow may be encountered due to the solvent volatilization. Also, many current solder pastes and fluxes have objectionable odors.

The rosin-based flux system requires an organic solvent to clean the flux residue after reflow. The best solvent for cleaning is a halogenated hydrocarbon. With the current restrictions on the use of halogenated hydrocarbons, this is a major problem with the commercial rosin based solder pastes.

The ideal solvent for flux clean-up is water due to its ready availability, low environmental impact, and low cost.

The use of Gafac RE-610, a trademark of GAF Corporation for a nonylphenyl polyoxyethylene ether phosphate, (whose chemical formula is shown in Table I), was reported in Anon, "Fluorocarbon Soluble Strong Acid Soldering Fluxes," Research Disclosure, Vol. 200, pg. 523–4, December 1980, as a flux component in wave soldering, as a wetting agent, but not in a solder paste formulation. Becker, G., Biverstedt, A. Tolvgard, A. "The Surfactant Flux—A New Flux for the Ozone Age," Hybrid Circuit, No. 16, pp. 66–68, May 1988, suggests the use of RE-610 in combination with amine or ammonium salts in an organic solvent to produce a liquid flux for wave solder that is fluorocarbon soluble. However, there is no suggestion of using a wave flux formulation as a solder paste flux since wave fluxes are more aggressive in general than solder paste fluxes. In addition, this was a solvent-based system and one of the objectives of this invention is to develop a solvent-free solder paste, and this reference does not suggest water as a solvent for cleaning; it emphasizes fluorocarbon solubility. Very significantly, this prior art does not discuss the critical aspects of solder paste, the good tack and tack-life, nor the needed screening properties.

U.S. Pat. No. 3,865,641 discloses a soldering composition to be mixed with an inorganic soldering flux such as phosphoric acid for use in soldering stainless steels. GAFAC RE-410 is suggested as a wetting agent. Amines are used as an inhibiting agent to inhibit the action of the acid flux. This is a solder paste formulation using a flux system of orthophosphoric acid, a small quantity of copper powder or copper salt, an amine as an inhibitor, and a wetting agent. Gafac wetting agents are specifically mentioned—but solely as materials for promoting uniform distribution of the inhibiting agent—not as a flux itself. Both the wetting agent and inhibitor are present in very small quantities (less than 4 percent each). The majority of the material is orthophosphoric acid (a very strong fluxing agent) and water. The amines used as inhibitors are amines possessing bulky substituents.

U.S. Pat. No. 4,151,015 discloses a water-soluble flux for plumbing soldering, which contains a water-soluble anionic or non-ionic surfactant and a corrosive water-soluble amine hydrohalide. This patent does not cover solder paste formulations.

U.S. Pat. No. 4,153,482 discloses a process for joining two metal surfaces together in which the surfaces are treated with a liquid flux. The liquid flux consists of an organic acid. The flux does not include any amine fluxing agents.

U.S. Pat. No. 4,168,996 discloses a non-water-soluble soldering flux combining rosins and many other components. A flux component is designed to release strong mineral acids or oxidizing agents at the use temperature and thus presents a corrosion hazard in electronics applications.

U.S. Pat. No. 4,298,407 discloses a solder powder coated with an organic flux rather than a solder paste. The residues are not water soluble.

U.S. Pat. No. 4,541,876 discloses a non-aqueous multi-component vehicle for metal paste therefore residues are not water-soluble.

U.S. Pat. No. 4,577,767 discloses a solder paste and vehicle. The paste is not water-soluble and requires an organic solvent wash.

U.S. Pat. No. 4,619,715 discloses a solder metal paste and vehicle, which contains a non-aqueous rosin binder. It is not water-soluble.

U.S. Pat. No. 4,728,023 discloses a process for vapor phase soldering utilizing a solder cream comprising solder metal and fluorinated tertiary alkylamines. The system is not water-soluble.

U.S. Pat. No. 4,180,419 reveals a solder flux formulation that is water-soluble using a polyhydric alcohol ester of phosphoric acid. This material is used as an application flux prior to hand-soldering or wave soldering, or as a solder wire core flux. No amine is disclosed. Though they claim use would be possible as solder paste, this has not been reduced to practice.

U.S. Pat. No. 4,196,024 discloses a soldering flux consisting of essentially mono- and/or di-alkyl phosphates or alkyl amine salts of these phosphates for use in a wave soldering system. The patent requires a foaming agent and organic carrier for the flux. There is no reference to a paste formulation and the flux is organic solvent soluble, not water-soluble.

SUMMARY OF THE INVENTION

The present invention provides an improved solder paste comprising from 80% to about 96%, by weight, of a powdered metal or blend of powdered metals, and having a particle size as shown in Table I, and an improved flux. The improved flux is free of natural rosins, and includes an organic polar fluxing agent, preferably RE-610, and a non-halogenated amine moderating agent, preferably triethanolamine, in a ratio of about 10:1 to about 1:1 by weight. The amine and organic polar fluxing agent are characterized by having a solubility in water of greater than 10% by weight. The resulting mixture acts as both the flux and the vehicle for the solder powder resulting in a superior solder paste. The amine agent is present from about 1–5% total weight of paste, and the organic polar fluxing agent is present from about 3–15% total weight of paste. The typical solder paste formulation uses about 90 parts by weight soft solder powder with about 10 parts of the above flux.

DETAILED DESCRIPTION OF THE INVENTION

This invention provides a simple water-soluble flux system that acts as both the vehicle for the solder powder and as the flux, which is a combination of an organic fluxing agent and a non-halogenated amine agent as a flux system. As used herein, water-soluble means greater than about 10% by weight solubility in water. This has many advantages over the current natural rosin-based fluxes. The simple 2-component flux system is conventionally prepared and stored and eliminates the problems with vendors' lot to lot variation of fluxes from natural products. Both the GAFAC RE-610 (made by GAF Corporation) which is the preferred organic fluxing agent and the triethanolamine which is the preferred amine are inexpensive materials and commercially available. There are no volatile components that cause the material to dry while being screened or after screening. The material has shown prolonged tack-life which allows component placement hours later than with typical solder pastes. The material has little or no odor. The solder flux residue is easily removed by water washing, thus eliminating the chlorofluorocarbon cleaning step and resulting in an overall cost reduction for the cleaning process, as well as eliminating adverse environmental impact.

The flux of the present invention removes metal oxides from solder powder while the paste has the proper rheology and viscosity for screening without the use of added thickeners or solvents for thinning. The invention encompasses a broad range of suitable viscosities, the suitability is determined initially by visual inspection. If needed, the suitability may be determined by a modified slump test which involves screening a small sample of the paste and observing the resulting slump. The preferred embodiment has a viscosity as follows: Ferranti-Shirley of about 300 + or −40 Pascal seconds at 45 sec$^{-1}$ measured over 120 seconds with a 2 cm, 1°, 100 micron truncated cone; Malcom at 5 rpm 3500 + or −500 Poise; Brookfield 10,000 + or −1000 Poise. Similarly, the invention encompasses a broad range of suitable tack values, determined by visual inspection; the preferred embodiment averages about 0.015 inches elongation for 8 hours (force pull test as measured on an Instron) where 0.006 inches is the minimal acceptance value. This invention has a tack-life of 24 hours or longer to hold components; since it is solvent free, this is a tremendous improvement compared to the current solder paste which hardens once the solvents volatilize. The limiting factor to its tack-life is humidity since the paste/flux is somewhat hygroscopic. There is no required pre-dry step before solder reflow since there is no solvent that needs to be removed by evaporation. The present invention is also essentially non-corrosive, having a pH from 6–8 (when admixed with 9 parts water). All the components in the paste are water soluble, before as well as after reflow. This is a major advantage since it will eliminate the use of organic solvents resulting in cost and waste reductions. This flux system/paste disclosed herein is also a significant improvement due to its simple preparation and high reproducibility.

FLUXING SYSTEM

The fluxing system is a mixture of the two components, one being a water soluble, non-halogenated amine and the other being a water-soluble organic moiety with a polar group.

The amine is characterized by aqueous solubility of greater than 10% weight to weight. The amine has several functions: it moderates the activity of the organic flux; it increases the viscosity to provide the right viscosity for screening; and in the preferred embodiment, it also acts as a mild fluxing agent. The amine is effective in a proportion of about 1-5% by weight of the solder paste, and advantageously, 1-4%. The most preferred proportion of the amine is 1-3%. The essential functional group of this component has the following structure:

where R, R' and R" are moieties selected from hydrogen, an alkyl group of 1-6 carbon atoms, and an alkanol group of 1-12 carbon atoms, a poly(alkylene oxide) group, or adducts thereof or any combination thereof. Amines of a molecular weight below 59 g/mole are less preferred due to their volatility, which causes the paste to possess objectionable odor.

A particularly useful group of amine compounds is the group including triethanolamine, diethanolamine, ethanolamine, triethylamine and tributylamine. The preferred amine is triethanolamine. Triethylamine and tributylamine produced a solder paste with a low viscosity which may render the paste unsuitable for stencilling, but may be desirable for other applications.

The organic flux with a polar group is effective in a proportion of 3-15% by weight of the solder paste and, advantageously 6-11%. The most preferred proportion is 8-10%. The polar group may be a carboxylic acid, a sulfonic acid, a phosphoric acid, a sulfate monoester, a phosphate monoester, a phosphate diester, a phosphate triester or mixtures thereof. The above described polar group may be attached to a moiety selected from the group consisting of an alkoxy group, an aryloxy group, an alkaryloxy group, a poly(alkyleneoxide) group or adducts thereof or any combination thereof.

The above described polar group may be attached to a moiety of the structure:

R—O— where R is a straight or branched chain alkyl group having 1 to 12 carbon atoms, preferably 8 carbons.

The above-described polar group may be attached to a moiety of the structure:

$R-C_6H_4-(OCH_2CH_2)_n-O-$ where R is a straight or branch chain alkyl group having 1-12 carbon atoms and n=4-15. The most preferred structure is where R is a straight or branch chain alkyl group containing 9 carbon atoms and n=8-11.

The organic fluxes with a polar group include the following commercially available products: GAFAC RE-610, GAFAC RE-410, (available from GAF Corporation under tradenames GAFAC RE-610 and GAFAC RE-410) WAYFOS D-10-N, and WAYFOS M-100 (available from Olin Corporation under tradenames WAYFOS D-10-N and WAYFOS M-100). The most preferred is the GAFAC RE-610.

THE METAL POWDER

Solder compositions useful herein as the metal powder for blending with the above-described flux system to form a paste are well known. Typically, solder compositions comprise tin together with lead and/or bismuth. Other solder metals such as silver, indium, cadmium with tin and/or lead combinations may also be used in the solder powder formulation. The metal powder particle size is in the range of from −200 to +325 and from −275 to +500 and from −325 to +500 mesh size.

OTHER DILUENT INGREDIENTS

Other ingredients such as polyethylene oxide, glycerine, dibutylcarbitol, or dipropylene glycol, added from 0.1 to 1.0% may be used as diluents to fine tune the rheology or viscosity, but they are not essential and do not change the basic charateristic of the flux.

SCOPE OF THE INVENTION

A variety of organic moieties and water-soluble amines were evaluated. See Table I. The best of the combinations was found to be Gafac RE-610 and triethanolamine. Both materials possess a group capable of acting as a flux. The RE-610 structure has a polar end and non-polar end, and is an excellent dispersant for solder powder, as exhibited by high quality screening. The oligomeric nature of RE-610 provides approximately the right viscosity for a solder flux; the addition of the triethanolamine thickens the combination to the ideal viscosity. In addition, triethanolamine properly moderates the RE-610 fluxing activity and, moreover, due to the hydrogen bonding inherent to its structure, results in a material with the rheological properties needed for screening. With its low vapor pressure and toxicity, triethanolamine represents little toxicological exposure.

TABLE I

| TYPICAL SOLDER PASTE FORMULATIONS | | | | | | |
|---|---|---|---|---|---|---|
|  Amines | pbw* | $R_2POH + RP(OH)_2$ | pbw | wt % | Metal Mesh Size** | Paste No |
| | | Organic Flux | | | | |
| Triethanolamine R = R" = R' = CH₂CH₂OH CAS#102-71-6 | 0.222 | GAFAC RE-610  n = 9 CAS#51811-79-1 | 1.00 | 88.7 | −275−+500 (53-25 microns) | 1 |

TABLE I-continued

TYPICAL SOLDER PASTE FORMULATIONS

| $R-\underset{\underset{R'}{|}}{N}-R''$ Amines | pbw* | $R_2POH + RP(OH)_2$ | pbw | wt % | Metal Mesh Size** | Paste No. |
|---|---|---|---|---|---|---|
| Triethanolamine<br>R = R'' =R' = $CH_2CH_2OH$<br>CAS#102-71-6 | 0.222 | GAFAC RE-610<br>R = $O(CH_2CH_2O)_n-C_6H_4-C_9H_{19}$<br>n = 9<br>CAS#51811-79-1 | 1.00 | 90 | −275−+500 | 1A |
| Triethanolamine<br>R = R'' =R' = $CH_2CH_2OH$<br>CAS#102-71-6 | 0.244 | GAFAC RE-610<br>R = $O(CH_2CH_2O)_n-C_6H_4-C_9H_{19}$<br>n = 9<br>CAS#51811-79-1 | 1.00 | 86.3 | −275−+500 | 2 |
| Triethanolamine<br>R = R'' =R' = $CH_2CH_2OH$<br>CAS#102-71-6 | 0.288 | GAFAC RE-610<br>R = $O(CH_2CH_2O)_n-C_6H_4-C_9H_{19}$<br>n = 9<br>CAS#51811-79-1 | 1.00 | 83 | −275−+500 | 3 |
| Triethanolamine<br>R = R'' =R' = $CH_2CH_2OH$<br>CAS#102-71-6 | 0.327 | GAFAC RE-610<br>R = $O(CH_2CH_2O)_n-C_6H_4-C_9H_{19}$<br>n = 9<br>CAS#51811-79-1 | 1.00 | 86 | −275−+500 | 4 |
| Triethanolamine<br>R = R'' =R' = $CH_2CH_2OH$<br>CAS#102-71-6 | 0.366 | GAFAC RE-610<br>R = $O(CH_2CH_2O)_n-C_6H_4-C_9H_{19}$<br>n = 9<br>CAS#51811-79-1 | 1.00 | 87 | −275−+500 | 5 |
| Triethanolamine<br>R = R'' =R' = $CH_2CH_2OH$<br>CAS#102-71-6 | 0.385 | GAFAC RE-610<br>R = $O(CH_2CH_2O)_n-C_6H_4-C_9H_{19}$<br>n = 9<br>CAS#51811-79-1 | 1.00 | 87.8 | −275−+500 | 6 |
| Triethanolamine<br>R = R'' =R' = $CH_2CH_2OH$<br>CAS#102-71-6 | 0.448 | GAFAC RE-610<br>R = $O(CH_2CH_2O)_n-C_6H_4-C_9H_{19}$<br>n = 9<br>CAS#51811-79-1 | 1.00 | 87.6 | −275−+500 | 7 |
| Triethanolamine<br>R = R'' =R' = $CH_2CH_2OH$<br>CAS#102-71-6 | 0.176 | GAFAC RE-610<br>R = $O(CH_2CH_2O)_n-C_6H_4-C_9H_{19}$<br>n = 9<br>CAS#51811-79-1 | 1.00 | 90 | −275−+500 | 8 |
| Diethanolamine<br>R = R' = $CH_2CH_2OH$<br>R'' = H<br>CAS#111-42-2 | 0.200 | GAFAC RE-610<br>R = $O(CH_2CH_2O)_n-C_6H_4-C_9H_{19}$<br>n = 9<br>CAS#51811-79-1 | 1.00 | 89.55 | −200−+325<br>(75-microns) | 9 |
| Ethanolamine<br>R = R' = H<br>R'' = $CH_2CH_2OH$<br>CAS#141-43-5 | 0.115 | GAFAC RE-610<br>R = $O(CH_2CH_2O)_n-C_6H_4-C_9H_{19}$<br>n = 9<br>CAS#51811-79-1 | 1.00 | 89.54 | −200−+325<br>(75-44 microns) | 10 |
| Triethylamine<br>R = R' = R'' = $CH_2CH_3$<br>CAS#121-44-8 | 0.203 | GAFAC RE-610<br>R = $O(CH_2CH_2O)_n-C_6H_4-C_9H_{19}$<br>n = 9<br>CAS#51811-79-1 | 1.00 | Not recorded | −275−+500<br>(53-25 microns) | 11 |
| Triethylamine<br>R = R' = R'' = $CH_2CH_3$<br>CAS#121-44-8 | 0.0496 | GAFAC RE-610<br>R = $O(CH_2CH_2O)_n-C_6H_4-C_9H_{19}$<br>n = 9<br>CAS#51811-79-1 | 1.00 | Not recorded | −275−+500<br>(53-25 microns) | 12 |
| Tributylamine<br>R = R' = R'' = $CH_2CH_2CH_2CH_3$<br>CAS#102-82-9 | 0.371 | GAFAC RE-610<br>R = $O(CH_2CH_2O)_n-C_6H_4-C_9H_{19}$<br>n = 9<br>CAS#51811-79-1 | 1.00 | Not recorded | Not recorded | 13 |
| Tributylamine<br>R = R' = R'' = $CH_2CH_2CH_2CH_3$<br>CAS#102-82-9 | 0.972 | GAFAC RE-610<br>R = $O(CH_2CH_2O)_n-C_6H_4-C_9H_{19}$<br>n = 9<br>CAS#51811-79-1 | 1.00 | 93 | Not recorded | 14 |
| Triethanolamine<br>R = R' = R'' = $CH_2CH_2OH$<br>CAS#102-71-6 | 0.452 | WAYFOS<br>D-10-N<br>R = $O(CH_2CH_2O)_n-C_6H_4C_9H_{19}$<br>n = 9-10<br>CAS#51811-79-1 | 1.00 | 88.4 | −325−+500 | 15 |
| Triethanolamine<br>R = R' = R'' = $CH_2CH_2OH$<br>CAS#102-71-6 | 0.468 | WAYFOS M100<br>R = $O(CH_2CH_2O)_n-C_6H_4C_9H_{19}$<br>n = 9-10<br>CAS#51811-79-1 | 1.00 | 89.2 | −325−+500 | 16 |
| Triethanolamine<br>R = R'' = R' = $CH_2CH_2OH$<br>CAS#102-71-6 | 0.374 | GAFAC RE-410<br>R = $O(CH_2CH_2O)_n-C_6H_4-C_9H_{19}$<br>n = 5<br>CAS#51609-41-7 | 1.00 | 89.4 | −200−+325<br>(75-44 microns) | 17 |
| Triethylamine<br>R = R' = R'' = $CH_2CH_3$<br>CAS#121-44-8 | 0.277 | GAFAC RE-410<br>R = $O(CH_2CH_2O)_n-C_6H_4-C_9H_{19}$<br>n = 5<br>CAS#51609-41-7 | 1.00 | 87.3 | −325−+500<br>(44-25 microns) | 18 |
| Tributylamine<br>R = R' = R'' = $CH_2CH_2CH_2CH_3$<br>CAS#102-82-9 | 0.362 | GAFAC RE-410<br>R = $O(CH_2CH_2O)_n-C_6H_4-C_9H_{19}$<br>n = 5<br>CAS#51609-41-7 | 1.00 | 90.9 | −325−+500<br>(44-25 microns) | 19 |

TABLE I-continued
TYPICAL SOLDER PASTE FORMULATIONS

| R—N(R')—R'' Amines | pbw* | $R_2POH + RP(OH)_2$ | pbw | wt % | Metal Mesh Size** | Paste No. |
|---|---|---|---|---|---|---|
| | | Phosphoric Acid Fluxes | | | | |
| Triethanolamine R = R'' = R' = CH$_2$CH$_2$OH CAS#102-71-6 | 2.12 | Phosphoric acid H$_3$PO$_4$ CAS#7664-38-2 | 1.00 | 88.97 | −270 + 500 (53–25 microns) | 20 |
| Triethanolamine R = R'' = R' = CH$_2$CH$_2$OH CAS#102-71-6 | 0.89 | Polyphosphoric acid CAS#8017-16-1 | 1.00 | NR | −270 +500 (53–25 microns) | 21 |
| Tributylamine R = R' = R'' = CH$_2$CH$_2$CH$_2$CH$_3$ CAS#102-82-9 | 0.687 | Phosphoric acid CAS#8017-16-1 | 1.00 | NR | −270 +500 (53–25 microns) | 22 |
| | | Carboxylic Acid Fluxes | | | | |
| Triethanolamine R = R' = R'' = CH$_2$CH$_2$OH CAS#102-71-6 | 0.310 | Sanodopan MA-18 CAS#28212-44-4 (nonyl phenol polyether, carboxylic acid | 1.00 | 92.8 | −270 +500 (54–25 microns) | 23 |
| Triethanolamine R = R' = R'' = CH$_2$CH$_2$OH CAS#102-71-6 | 2.54 | Acetic acid R = CH$_3$ CAS#64-19-7 | 1.00 | 91.1 | −325 +500 (44–25 microns) | 24 |
| Triethanolamine R = R' = R'' CH$_2$CH$_2$OH CAS#102-71-6 | 1.15 | Propionic acid R = CH$_2$CH$_3$ CAS#79-09-4 | 1.00 | 88.7 | −325 +500 (44–25 microns) | 25 |
| | | Sulfonic Acid Fluxes | | | | |
| Triethanolamine R = R' = R'' = CH$_2$CH$_2$OH CAS#102-71-6 | 0.282 | Dodecylbenzene-sulfonic acid CAS#28212-44-4 | 1.00 | 89.4 | −325 +500 (44–25 microns) | 26 |
| Triethanolamine R = R' = R'' = CH$_2$CH$_2$OH CAS#102-71-6 | 0.956 | Methanesulfonic acid R = CH$_3$ CAS#7664-93-9 | 1.00 | 90.3 | −325 +500 (44–25 microns) | 27 |

*parts by weight

TABLE II
PASTE FORMULATION CHARACTERISTICS

| Paste No. | Viscosity | Shelf Life (Days) | Tack* | Tack Life (hours) | Fluxing* Ability | Overall Performance* |
|---|---|---|---|---|---|---|
| 1 | O.K. | 30** | 5 | 8 | 5 | 5 |
| 1A | O.K. | 60 | 5 | 8 | 5 | 5 |
| 2 | O.K. | 60 | 5 | 8 | 5 | 5 |
| 3 | O.K. | 60 | 5 | 8 | 5 | 5 |
| 4 | O.K. | 60 | 4 | 8 | 5 | 4 |
| 5 | O.K. | 60 | 4 | 8 | 5 | 3 |
| 6 | O.K. | approximately 45 | 4 | 8 | 5 | 3 |
| 7 | thin | approximately 45 | 3 | 8 | 5 | 3 |
| 8 | O.K. | 60 | 4 | 8 | 5 | 5 |
| 9 | O.K. | approximately 45 | 3 | — | 4 | 4 |
| 10 | O.K. | approximately 45 | 3 | — | 4 | 4 |
| 11 | thin | — | 3 | — | 5 | 2 |
| 12 | thin | — | 3 | — | 5 | 2 |
| 13 | thin | — | 1 | — | 1 | 1 |
| 14 | thin | — | 3 | — | 5 | 2 |
| 15 | O.K. | — | 4 | 8 | 4 | 4 |
| 16 | O.K. | — | 5 | 8 | 5 | 4 |
| 17 | thick | 60 | 2 | — | 5 | 2 |
| 18 | thin | — | 1 | — | 4 | 1 |
| 19 | thin | — | 1 | — | 2 | 1 |
| 20 | O.K. | 7** | 2 | — | 3 | 2 |
| 21 | thick | — | — | — | 3 | 1 |
| 22 | thick | — | — | — | 3 | 1 |
| 23 | thin | 80 | 2 | — | 5 | 2 |
| 24 | NS/TD | — | TD | — | 3 | 1 |
| 25 | thin | 30** | 2 | 4 | 5 | 3 |
| 26 | thick | 25 | 3 | 8 | 1 | 1 |
| 27 | NS/TD | — | TD | — | 3 | 1 |

\* = The tack, fluxing ability and overall suitability of the solder pase formulations are rated on a scale of 1–5, one being the least satisfactory performance, 5 being the highest.
\*\* = as far as measured
\*\*\* = viscosity suitability determined visually and then by test screening or stencilling a sample
— = not tested
TD = too dry
NS = not screenable Any of the phosphate ester compounds are interchangeable with RE-610. RE-610 was selected based on The novelty of this system is exemplified by the fact that one cannot use only the organic flux in a solder paste formulation. Although RE-610 as a single component added to solder powder does work as a flux system, showing reasonable screening properties and reflow, it has a very limited shelf-life once mixed with solder powder (on the order of days), due to its high activity as a flux. It was found that it is possible to reduce the activity of the phosphoric acid end group by adding a moderating agent. In the present application, the amine functions to help moderate the flux. Amines moderate the RE-610 to just the right extent which could not be anticipated from the prior art.

In contrast polymers of either the organic moiety or the amine do not function properly. Both polyethylenimine and polyacrylic acid were investigated for this purpose. Solder paste made from polyethyleneimine has poor rheological properties; it screens very poorly, sticking to the stencil instead of wiping clean on the stencil, and it does not show the desirable rolling behavior in front of the squeegee as it is being screened. In addition, its hygroscopic behavior may cause problems as this leads to excessive amounts of moisture being absorbed and then released during reflow which leads to sputtering of solder all over the circuit board. Likewise, polyacrylic acid did not perform adequately: solder paste made from it exhibits poor solder reflow.

A large number of amines were evaluated as moderators for RE-610. See Table II. Both triethylamine and tributylamine adequately moderated the activity of the RE-610, but the Viscosity of the resulting flux was too low for screening. However, this characteristic may be desirable for other applicatons. Low molecular weight amines are quite volatile, and higher molecular weight amines are not water soluble. In addition to this drawback there are concerns about the toxicity of these amines.

PREPARATION OF THE FLUX

The flux is prepared by mixing the water soluble amine flux with the organic polar flux. The solder paste is prepared by mixing the resulting flux and the powdered metal solder.

The solder paste may be applied to a circuit board by several methods such as screening through a stencil or screen or by syringe (with suitable reduction in viscosity). The board is then heated until the solder is reflowed. Any residues are then removed by a water wash.

While several embodiments of the invention have been shown and described, various adaptations and modifications can be made without departing from the scope of the invention as defined in the appended claims.

What is claimed is:

1. An improved essentially non-corrosive, low toxicity, water-soluble, solder paste characterized by high tack and long tack life, consisting essentially of about 80% to 96% by weight of a solder metal powder; and about 4 to 20% by weight of a non-corrosive, water soluble flux, said water-soluble flux comprising a mixture of two non-corrosive, water-soluble components, one component being about 3 to 15% by weight of an organic moiety with a polar group selected from a group consisting of carboxylic acids, sulfonic acids, phosphoric acids, sulfate monoesters and phosphate esters or mixtures thereof, the other component being about 1 to 5% by weight of a non-halogenated amine.

2. A paste as defined in claim 1 wherein said phosphate ester consists essentially of a phosphate monoester, a phosphate diester, a phosphate triester or mixtures thereof.

3. A paste as defined in claim 1 wherein the polar group is attached to a moiety of the structure:

R—O— where R is a straight or branched chain alkyl group having 1 to 12 carbons atoms.

4. A paste as defined in claim 1 where the polar group is attached to a moiety of the structure:

R—O— where R is a straight or branched chain alkyl group containing eight carbon atoms.

5. A paste as defined in claim 1 wherein the polar group is attached to a moiety of the structure:

$R-C_6H_4-(OCH_2CH_2)_n-O-$ where R is a straight or branched chain alkyl group having one to twelve carbon atoms, and n=4-15.

6. A paste as defined in claim 1 where the polar group is attached to a moiety of the structure:

$R-C_6H_4-(OCH_2CH_2)_n-O-$ where R is a straight or branched chain alkyl group containing nine carbon atoms, and n=8-11.

7. A paste as described in claim 1 wherein the water-soluble amine is a primary or secondary or tertiary amine of the structure:

R—N—R'
|
R"

where R, R', and/or R" are moieties selected from a group consisting of the following moieties: a hydrogen atom, an alkyl group of one to six carbon atoms, an alkanol group of one to twelve carbon atoms, or a poly(alkylene oxide) group, or adducts thereof or any combination thereof.

8. A paste as defined in claim 1 in which the amine is triethanolamine.

9. An improved essentially water-soluble flux for use with solder powder characterized by high tack and long tack life, consisting essentially of a mixture of two non-corrosive, water-soluble components, one of which is an organic moiety with a polar group selected from a group consisting of carboxylic acids, sulfonic acids, phosphoric acids, sulfate monoesters and phosphate esters or mixtures thereof, the other of which is non-halogenated amine.

10. A flux as defined in claim 9 wherein said phosphate ester consists essentially of a phosphate monoester, a phosphate diester, a phosphate triester or mixtures thereof.

11. A water-soluble flux in accordance with claim 9 wherein the polar group is attached to a moiety selected from the group consisting of an alkoxy group, an aryloxy group, an alkaryloxy group, a poly(alkyleneoxide) group or adducts thereof, or any combination thereof.

12. A flux as defined in claim 9 wherein the polar group is attached to a moiety of the structure:

where R is a straight or branched chain alkyl group having one to twelve carbon atoms, and n=4-15.

13. A flux as defined in claim 9 where the polar group is attached to a moiety of the structure:

where R is a straight or branched chain alkyl group containing nine carbon atoms and n=8-11.

14. A flux as described in claim 9 wherein the water soluble amine is a primary or secondary or tertiary amine of the structure:

where R, R', and/or R" are moieties selected from a group consisting of a hydrogen atom, an alkyl group of one to six carbon atoms, an alkanol group of one to twelve carbon atoms, a poly(alkylene oxide) group, or adducts thereof or any combination thereof.

15. A flux as defined in claim 9 in which the amine is triethanolamine.

16. The paste of claim 2, wherein said non-halogenated amine is an alkanol amine.

17. The flux of claim 10, wherein said non-halogenated amine is an alkanol amine.

* * * * *